United States Patent
Cheng et al.

(10) Patent No.: US 7,161,543 B2
(45) Date of Patent: Jan. 9, 2007

(54) ANTENNA SET FOR MOBILE DEVICES

(75) Inventors: Ping-Xi Cheng, Taipei (TW); He-Jun Chang, Taipei (TW)

(73) Assignee: Winston NeWeb Corp., Taipei Hsien (TW)

( * ) Notice: Subject to any disclaimer, the term of this patent is extended or adjusted under 35 U.S.C. 154(b) by 45 days.

(21) Appl. No.: 10/973,379

(22) Filed: Oct. 25, 2004

(65) Prior Publication Data

US 2005/0093752 A1  May 5, 2005

(30) Foreign Application Priority Data

Oct. 31, 2003  (TW) ............... 92130452 A (51) Int. Cl.
*H01Q 1/24* (2006.01)

(52) U.S. Cl. ............... 343/702; 343/700 MS
(58) Field of Classification Search ........ 343/702, 343/700 MS, 846, 848
See application file for complete search history.

(56) References Cited

U.S. PATENT DOCUMENTS

| | | | |
|---|---|---|---|
| 6,166,694 A | 12/2000 | Ying | |
| 6,407,715 B1 | 6/2002 | Chen | |
| 6,414,642 B1 | 7/2002 | Honda et al. | |
| 6,580,398 B1 | 6/2003 | Breakall | |
| 6,686,886 B1 * | 2/2004 | Flint et al. | 343/702 |
| 6,812,892 B1 * | 11/2004 | Tai et al. | 343/700 MS |
| 6,844,853 B1 * | 1/2005 | Tai et al. | 343/700 MS |
| 6,861,986 B1 * | 3/2005 | Fang et al. | 343/700 MS |
| 2003/0112195 A1 * | 6/2003 | Cheng et al. | 343/767 |
| 2004/0073462 A1 * | 4/2004 | Cazzell et al. | 705/3 |

* cited by examiner

*Primary Examiner*—Trinh Dinh
*Assistant Examiner*—Huedung Mancuso
(74) *Attorney, Agent, or Firm*—Ingrassia, Fisher & Lorenz, P.C.

(57) ABSTRACT

An antenna for the mobile electronic device. The antenna includes a first L-shaped element connecting to a second L-shaped element. Both elements are used for sending and receiving signals in a frequency band. Besides, an antenna set includes a first antenna unit and a second antenna unit, which are configured to optimize the superposition of both radiations as isotropic.

16 Claims, 5 Drawing Sheets

ANTENNA SET FOR MOBILE DEVICES

CROSS REFERENCE TO RELATED APPLICATIONS

This application claims priority of Taiwan Patent Application Serial No. 092130452 filed on Oct. 31, 2003.

FIELD OF INVENTION

The present invention relates to an antenna and an antenna set for use with mobile electronic devices.

BACKGROUND OF THE INVENTION

Since the mobile phones are introduced to the market, they are popular around the world and become necessary to one's life. Besides, more and more electronic devices, such as PDAs, laptops, tablet PCs, or consumer electronics integrate wireless communication capabilities. For mobile electronic devices mentioned above, an antenna is the core component for wireless connections. Therefore, it is always desirable to scale down the size, improve the performance, and increase the pattern receiving diversity of the antenna.

U.S. Pat. No. 6,166,694 discloses a miniature, built-in dual band antenna which is suitable for use in mobile devices, wherein the built-in antenna includes two spiral conductor arms which are of different lengths and capable of being tuned to different frequency bands. And U.S. Pat. No. 6,407,715 discloses an antenna having a conductive ground plate, a conductive first plate set above the ground plate, and a signal feed electrically connected to the ground plate and the first plate. The first plate has two slots extending from two edges of the first plate for receiving or sending signals.

U.S. Pat. No. 6,414,642 discloses a slot antenna having a pair of orthogonally oriented front and rear reflector panels. The orthogonal slot antenna assembly disclosed is useful in laptop computers or other wireless devices benefiting from a compact and yet robust antenna which radiates with multiple patterns in various multiple orientations. Also U.S. Pat. No. 6,339,400 discloses an antenna implementation in which two whip-like/slot embedded antennas are placed on the left and right edge of the display. Using two antennas instead of one antenna will reduce the blockage caused by the display in some directions and provide space diversity to the communication system.

As antennas embedded in mobile devices become increasingly popular, a need exists for a compact antenna having low manufacture costs and being able to receive signals from all directions.

SUMMARY OF THE INVENTION

One aspect of the present invention is to provide an antenna for use with mobile electronic devices. Another aspect of the present invention is to provide an antenna set being able to receive signals from all directions for use with mobile electronic devices.

In one embodiment of the invention, an antenna set, incorporated in a device, includes a first antenna, a second antenna, and a base. The first antenna includes a first ground point, and the first antenna has a first radiation pattern. The second antenna includes a second ground point, and the second antenna has a second radiation pattern. The base is provided for mounting the first antenna and the second antenna onto the device. The first antenna and the second antenna are configured to increase space diversity of superimposition of the first radiation pattern and the second radiation pattern. The base connects to the first ground point and the second ground point for providing a common ground for the first antenna and the second antenna.

In another embodiment, an antenna includes a base, a first L-shaped element, a second L-shaped element, and a signal feed. The base has an edge. The first L-shaped element has a first arm and a second arm, and the second arm of the first L-shaped element has a first length. The second L-shaped element is provided for sending and/or receiving signals in a first frequency band. The second L-shaped element has a first arm and a second arm. Preferably, the first arm of the first L-shaped element is perpendicular to and connected to the edge of the base at a first connection point. The second arm of the first L-shaped element is parallel to the edge of the base. The first arm of the second L-shaped element connects to the second arm of the first L-shaped element at a second connection point. The signal feed is located at the second arm of the first L-shaped element, and the signal feed and the second connection point are distanced from each other by a first predetermined distance.

The antenna also includes a third L-shaped element for sending and/or receiving signals in a second frequency band. The third L-shaped element has a first arm and a second arm. The first arm of the third L-shaped element connects to the second arm of the first L-shaped element at a third connection point, and the third connection point and the second connection point are distanced from each other by a second predetermined distance.

The antenna further includes a ground point located at the edge of the base. The ground point and the first connection point are substantially distanced from each other by the first length. Thus the first L-shaped element, the edge of the base, the ground point, and the signal feed form a slot structure for sending and/or receiving signals in the first frequency band.

The foregoing and other features of the invention will be apparent from the following more particular description of embodiment of the invention.

BRIEF DESCRIPTION OF THE DRAWINGS

The embodiments of this invention will be described in detail, with reference to the following figures, wherein similar elements are numbered with similar designations.

DETAILED DESCRIPTION

The present invention directs to the antenna and the antenna set for use with mobile electronic devices, such as mobile phones, laptops, PDAs, and tablet PCs. The antenna and the antenna set are provided for receiving/sending signals in at least one frequency band. It is known to those skilled in the art that a frequency band is typically represented by the center frequency of the frequency band. In the followings, the first frequency represents the first frequency band, and the second frequency represents the second frequency band. It should be noted that, for the purpose of understanding the present invention, a first embodiment for receiving/sending signals in the first frequency band is described at first, followed by a second embodiment for receiving/sending signals in the first and second frequency bands. The third and fourth embodiments for the invention relate to antenna sets integrated with electronic devices.

Figure 1:
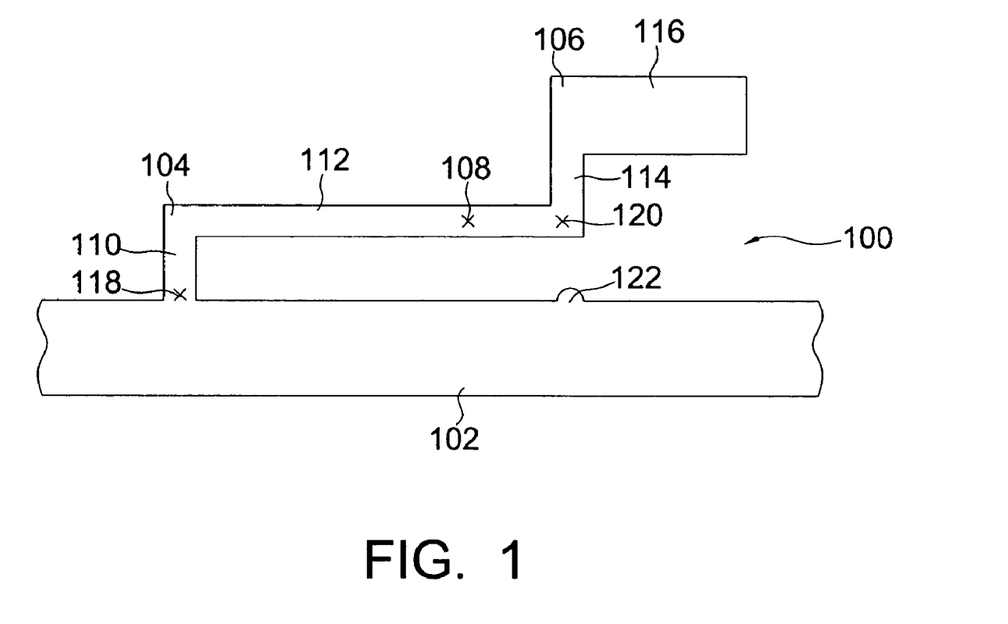
FIG. 1 is a diagram of an antenna according to an embodiment of the present invention.

Referring to FIG. 1, an antenna 100 includes a base 102, a first L-shaped element 104 and a second L-shaped element 106. Here the base 102 works as the ground of the antenna 100 and has an edge. The first L-shaped element 104 has a first arm 110 and a second arm 112, wherein the second arm 112 has a first length. A signal feed 108 is located at the second arm 112. The second L-shaped element 106 is for sending and/or receiving signals in a first frequency band. The second L-shaped element 106 has a first arm 114 and a second arm 116. The first arm 110 of the first L-shaped element 104 is substantially perpendicular to and connected to the edge of the base 102 at a first connection point 118. The second arm 112 of the first L-shaped element 104 is substantially parallel to the edge of the base 102. The first arm 114 of the second L-shaped element 106 connects to the second arm 112 of the first L-shaped element 104 at a second connection point 120.

The second L-shaped element 106 may be regarded as a part of an inverted-F antenna or a single pole antenna. The location of signal feed 108 primarily determines the impedance, while the second arm 112 may also provide certain effect on resonating frequency. The signal feed 108 and the second connection point 120 are distanced from each other by a first predetermined distance that ranges from zero to the length of the second arm 112. Accordingly, there are two corners between the signal feed 108 and the end of the second arm 116, which makes the radiation pattern of the antenna become omnidirectional. Besides, a length of the second arm 116 of the second L-shaped element 106 is substantially ¼ of a wavelength corresponding to the first frequency, and the first L-shaped element 104 is provided as a matching bridge. As a result, the second L-shaped element 106 can receive/send signals in the first frequency band. In addition, a ground point 122 is located at the base 102. The ground point 122 and the first connection point 118 are distanced from each other. The first L-shaped element 104, the edge of the base 102, the ground point 122, and the signal feed 108 form a slot structure for sending/receiving signals. In one embodiment, the first length is substantially one-half of a wavelength corresponding to the first frequency so that the slot structure can also receive/send signals in the first frequency band. That is, both the second L-shaped element 106 and the slot structure are used to receive/send signal in the first frequency band, which increases the efficiency of the antenna 100. The first frequency band covers IEEE 802.11a frequency (approximately from 5.15 GHz to 5.725 GHz). In another embodiment, the center frequency of the second L-shaped element 106 is slightly different from the center frequency of the slot structure to broaden the applicable bandwidth of the antenna 100 to cover, for example, approximately from 5.15 GHz up to 7 GHz.

Figure 2:
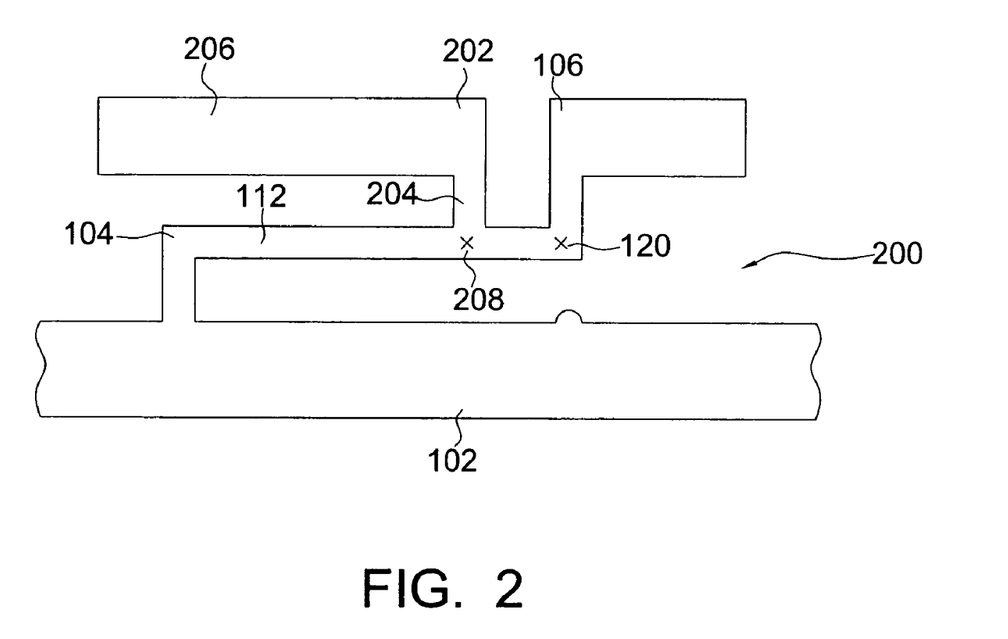
FIG. 2 is a diagram of an antenna according to another embodiment of the present invention.

Referring to FIG. 2, a dual-band antenna 200, in addition to a first L-shaped element 104 and a second L-shaped element 106, further includes a third L-shaped element 202 for sending and/or receiving signals in a second frequency band. The third L-shaped element 202 has a first arm 204 and a second arm 206. The first arm 204 of the third L-shaped element 202 connects to the second arm 112 of the first L-shaped element 104 at a third connection point 208. A length of the second arm 206 of the third L-shaped element 202 is substantially ¼ of a wavelength corresponding to a second frequency. Thus the third L-shaped element 202 is for receiving/sending signals in the second frequency band. Besides, the third connection point 208 and the second connection point 120 are distanced from each other by a second predetermined distance. This design lowers the interference of the signals in the first frequency band and in the second frequency band. In one embodiment, the second frequency band covers IEEE 802.11b standard (approximately from 2.4 GHz to 2.5 GHz).

In another embodiment, the antenna 200, incorporated in a mobile phone, provides the first frequency band as GSM band (around 900 MHz), and the second frequency band as DCS band (around 1800 MHz). However, one skilled in the art will appreciate that other superimpositions of frequency bands may be implemented without departing from the spirit and scope of the present invention. For example, other possible combinations of low and high bands could include GSM+PCS, GSM+WCDMA, DCS+WCDMA, GSM+GPS, GSM+ISM, or any other combination of lower and higher frequency bands. This antenna structure 200 may also receive signals from three different frequency bands with the second L-shaped element 106, the third L-shaped element 202, and the slot between arm 112 and the edge of base 102.

Figure 3:
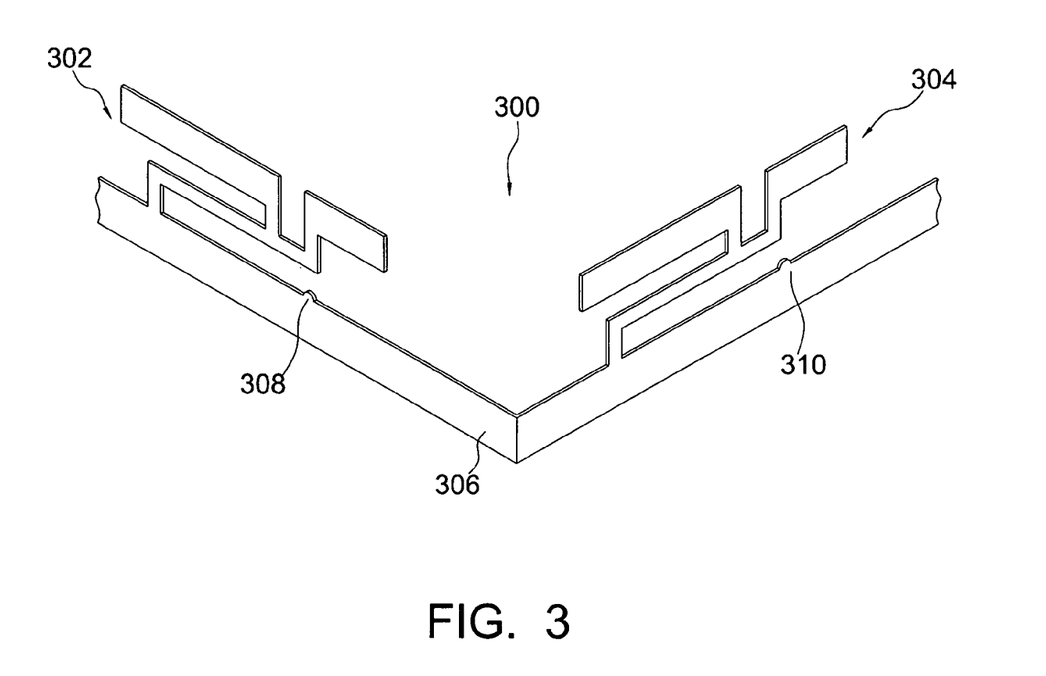
FIG. 3 is a diagram of an antenna set according to an embodiment of the present invention.

Referring now to FIG. 3, an antenna set 300, incorporated in a device, such as a mobile phone, a laptop, a PDA or a tablet PC, includes a first antenna 302, a second antenna 304, and a base 306. The first antenna unit 302 includes a first ground point 308 and has a first radiation pattern. The second antenna unit 304 includes a second ground point 310 and has a second radiation pattern. The base 306 mounts the first antenna unit 302 and the second antenna unit 304 onto the device, and serves as the grounding of the antenna set. The first antenna unit 302 and the second antenna unit 304 are configured to increase space diversity of superimposition of the first radiation pattern and the second radiation pattern. The base 306 includes the first ground point 308 and the second ground point 310 for providing a common ground for the first antenna unit 302 and the second antenna unit 304.

In one embodiment, the first antenna unit 302 and the second antenna unit 304 are substantially identical in geometry structure The first antenna unit 302 and the second antenna unit 304 are disposed substantially. Besides, as the first antenna unit 302 and the second antenna unit 304 shares a common ground element, the base 306, bigger grounding element causes a better performance of the antenna set 300.

For example, both the first antenna unit 302 and the second antenna unit 304 are dual band antenna units and are substantially identical to each other in geometry structure and receive/send signals of IEEE 802.11a and 802.11b standards. Besides, the first antenna unit 302, the second antenna unit 304, and the base 306 are integrally formed as one piece without complex manufacture and laborious assembly, thus reduces the manufacturing cost and simplifies the production process. The antenna set 300 can be integrated in a laptop, a tablet PC, a PDA, or a smart phone, to provide wireless connections. In other embodiments, the antenna set 300 may be implemented in a telecommunication device like a cell phone to provide connection service with combinations of low and high frequency bands.

Figure 4:
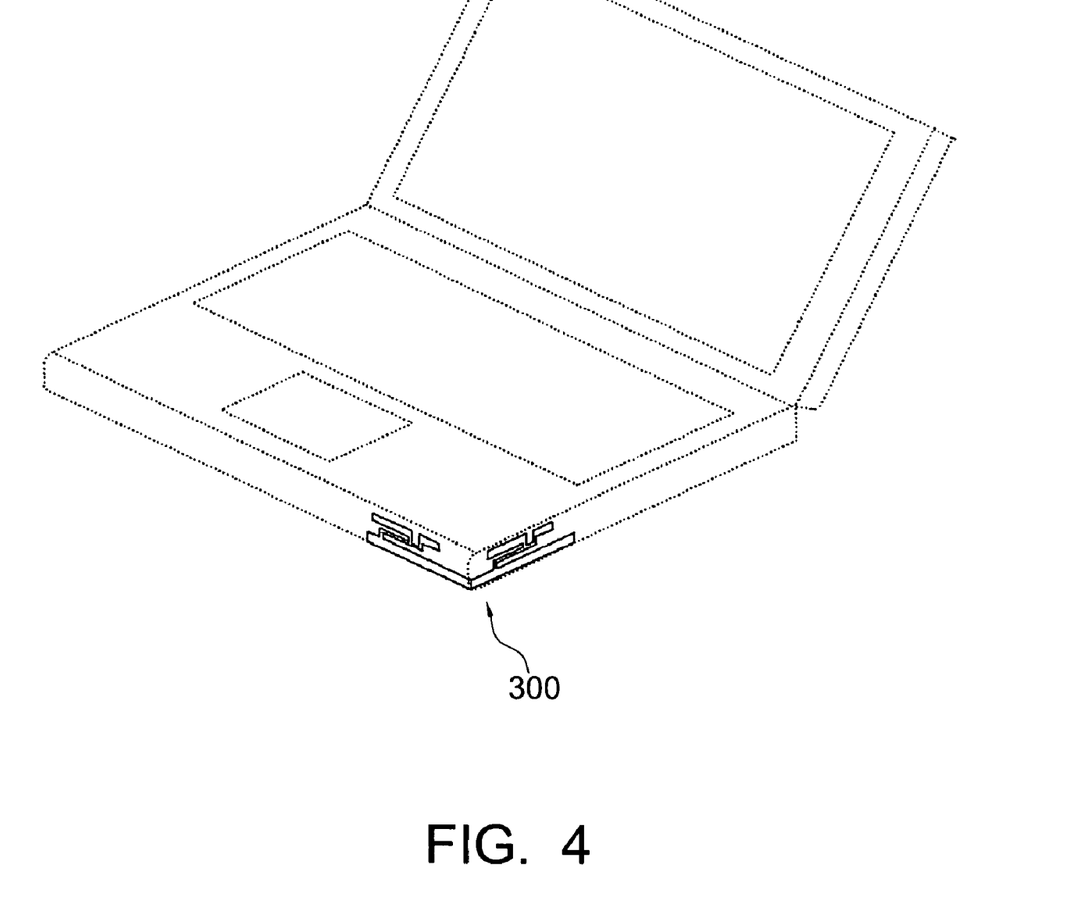
FIG. 4 is a diagram of an antenna set according to another embodiment of the present invention.

FIG. 4 is a diagram of the antenna set 300 mounted on a laptop. The antenna set can also be affixed around any corner of the laptop such as the on LCD display. The first antenna and the second antenna are disposed substantially perpendicularly to each other to increase space diversity of superimposition of the first radiation pattern and the second radiation pattern. Besides, as the common ground for the first antenna unit 302 and the second antenna unit 304, the base 306 electrically may also connect to the grounding frame of the laptop or the shielding plate of the LCD display to improve the performance of the antenna set 300.

Figure 5:
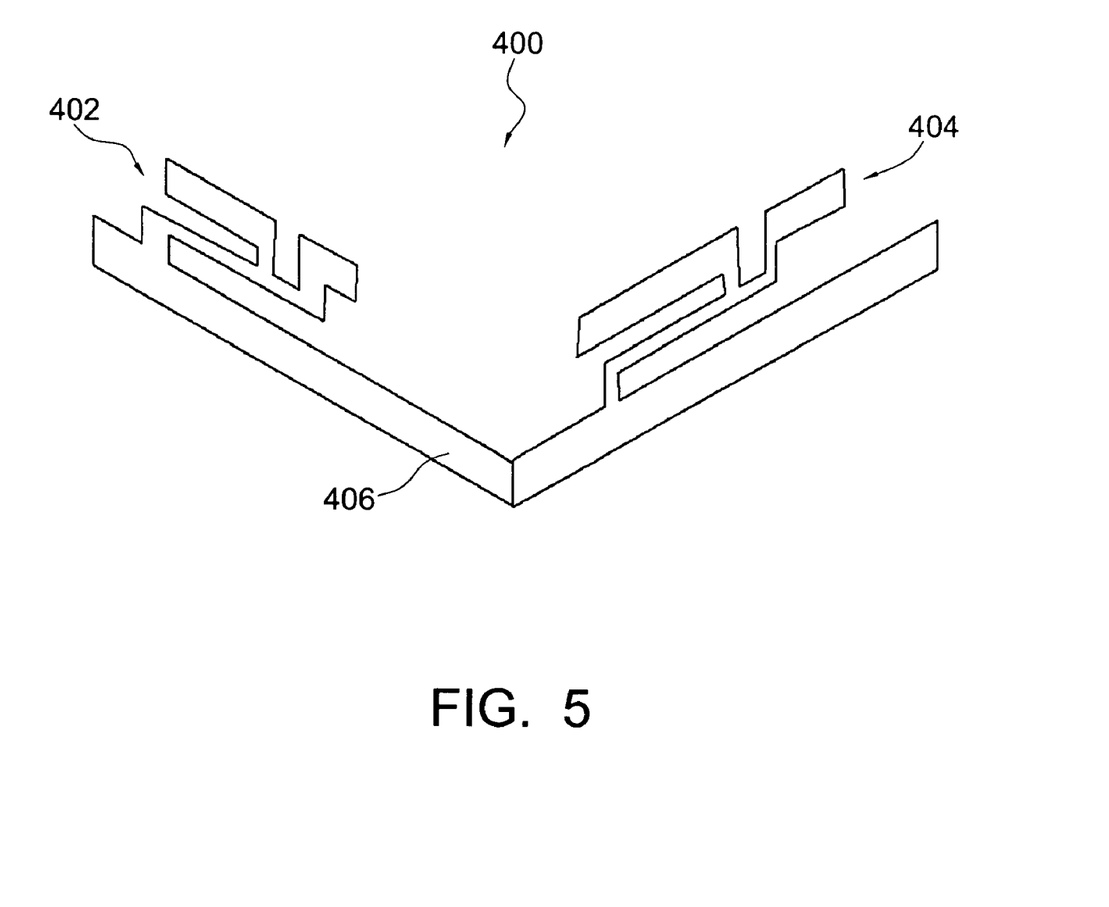
FIG. 5 is a diagram of an antenna set according to still another embodiment of the present invention.

Referring now to FIG. 5, an antenna set 400 includes a first antenna unit 402, a second antenna unit 404, and a base 406. Both of the first antenna unit 402 and the second antenna unit 404 are dual-band antennas, but they are different in geometry structure. The first antenna unit 402 is used for receiving/sending signals in a first frequency band and a second frequency band. The second antenna unit 404 is used for receiving/sending signals in a third frequency band and a fourth frequency band. That is, the antenna set 400 can receive signals form four different frequency bands.

Figure 6:
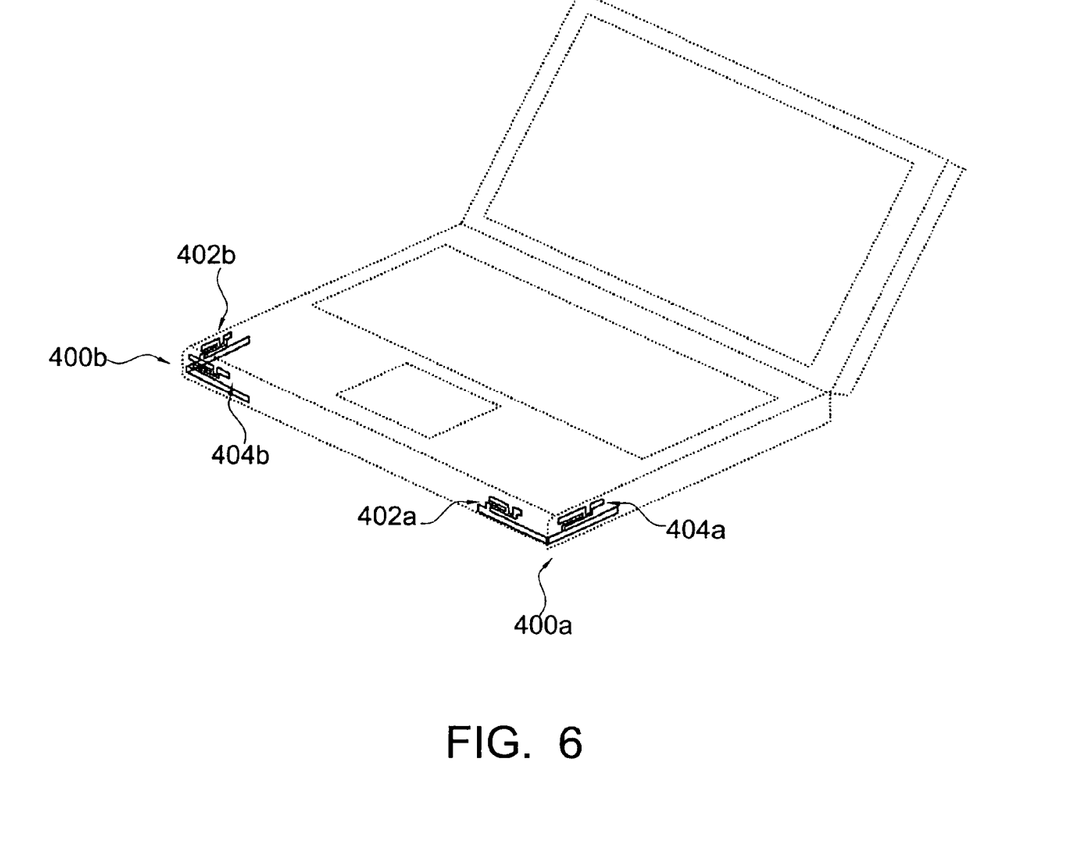
FIG. 6 is a diagram of antenna sets according to a embodiment of the present invention.

Generally, one single antenna set is good enough to receive/send signals. In FIG. 6, however, the four-band antenna sets 400a and 400b are respectively placed at different corners of a laptop to reduce the blockage effect caused by the components inside the laptop in some directions. In addition, the antenna unit 402a of the antenna set 400a and the antenna unit 402b of the antenna set 400b are disposed substantially perpendicularly to each other, thus the laptop is capable of receiving radiation signals in first and second frequency bands from different directions. Likewise, the antenna unit 404a of the antenna set 400a and the antenna unit 404b of the antenna set 400b are disposed substantially perpendicularly to each other, thus the laptop is capable of receiving radiation signals in third and fourth frequency bands from different directions. Therefore, signals transmission in four frequency bands are optimized by the design in FIG. 6. The antenna sets 400a and 400b can also be affixed around any corner of the laptop such as the on LCD display.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

The invention claimed is:

1. An antenna, comprising:
   a base;
   a first L-shaped element comprising a first arm and a second arm, said second arm of said first L-shaped element having a first length;
   a second L-shaped element for sending and/or receiving signals in a first frequency band, said second L-shaped element having a first arm and a second arm;
   a third L-shaped element for sending and/or receiving signals in a second frequency band, said third L-shaped element having a first arm and a second arm; and
   a signal feed;
   wherein said first arm of said first L-shaped element connects substantially perpendicularly to said base at a first connection point, wherein said second arm of said first L-shaped element is substantially parallel to an edge of said base, and wherein said first arm of said second L-shaped element connects to said second arm of said first L-shaped element at a second connection point;
   wherein said signal feed is located at said second arm of said first L-shaped element, and said signal feed and said second connection point are separated by a first predetermined distance, wherein said first length is substantially one-half of the wavelength of said first frequency; and
   wherein said first arm of said third L-shaped element connects to said second arm of said first L-shaped element at a third connection point, and said third connection point and said second connection point are separated by a second predetermined distance.

2. The antenna of claim 1, wherein a length of said second arm of said second L-shaped element is substantially one-quarter of a wavelength corresponding to said first frequency, and wherein a length of said second arm of said third L-shaped element is substantially one-half of a wavelength corresponding to said second frequency.

3. An antenna, comprising:
   a base having an edge;
   a first L-shaped element comprising a first arm and a second arm, said second arm of said first L-shaped element having a first length;
   a second L-shaped element for sending and/or receiving signals in a first frequency band, said second L-shaped element having a first arm and a second arm; and
   a signal feed;
   a ground point located at said edge of said base, said ground point and said first connection point are substantially distanced from each other by said first length;
   a third L-shaped element for sending and/or receiving signals in a second frequency band; said third L-shaped element having a first arm and a second arm;
   wherein said first arm of said first L-shaped element is substantially perpendicular to and is connected to said edge of said base at a first connection point, said second arm of said first L-shaped element is substantially parallel to said edge of said base, said first arm of said second L-shaped element connects to said second arm of said first L-shaped element at a second connection point,
   wherein said first L-shaped element, said edge of said base, said ground point and said signal feed form a slot structure for sending and/or receiving signals in said first frequency band, and
   wherein said first arm of said third L-shaped element connects to said second arm of said first L-shaped element at a second connection point, and said second connection point and said signal feed are distanced from each other by a second predetermined distance.

4. The antenna of claim 3, wherein said first length is substantially one-half of a wavelength corresponding to said first frequency, wherein a length of said second arm of said second L-shaped element is substantially one-quarter of a wavelength corresponding to said first frequency, and wherein a length of said second arm of said third L-shaped element is substantially one-half of a wavelength corresponding to said second frequency.

5. An antenna set incorporated in a device, comprising:
   a first antenna unit comprising a first ground point, said first antenna unit having a first radiation pattern;
   a second antenna unit comprising a second ground point, said second antenna unit having a second radiation pattern; and
   a base connecting to said first antenna unit and said second antenna unit;
   wherein said first antenna unit is substantially perpendicular to said second antenna unit; and
   wherein said base connects to said first ground point and said second ground point for providing a common ground for said first antenna and said second antenna.

6. The antenna set of claim 5, wherein said first antenna unit is substantially identical to said second antenna unit in geometry structure.

7. The antenna set of claim 5, wherein both said first antenna unit and said second antenna unit are dual-band antennas.

8. The antenna set of claim 5, wherein said first antenna unit comprises:
a base;
a first L-shaped element comprising a first arm and a second arm, said second arm of said first L-shaped element having a first length;
a second L-shaped element for sending and/or receiving signals in a first frequency band, said second L-shaped element having a first arm and a second arm; and
a signal feed;
wherein said first arm of said first L-shaped element connects substantially perpendicularly to said base at a first connection point, wherein said second arm of said first L-shaped element is substantially parallel to an edge of said base, and wherein said first arm of said second L-shaped element connects to said second arm of said first L-shaped element at a second connection point; and
wherein said signal feed is located at said second arm of said first L-shaped element, and said signal feed and said second connection point we separated by a first predetermined distance.

9. The antenna set of claim 5, wherein said first antenna unit comprises:
a base having an edge;
a first L-shaped element comprising a first arm and a second arm, said second arm of said first L-shaped element having a first length;
a second L-shaped element for sending and/or receiving signals in a first frequency band, said second L-shaped element having a first arm and a second arm; and
a signal feed;
a ground point located at said edge of said base, said ground point and said first connection point are substantially distanced from each other by said first length;
wherein said first arm of said first L-shaped element is substantially perpendicular to and is connected to said edge of said base at a first connection point, said second arm of said first L-shaped element is substantially parallel to said edge of said base, said first arm of said second L-shaped element connects to said second arm of said first L-shaped element at a second connection point; and
wherein said first L-shaped element, said edge of said base, said ground point, and said signal feed form a slot structure for sending and/or receiving signals in said first frequency band.

10. The antenna set of claim 5, wherein said first antenna unit, said second antenna unit, and said base are integrally formed.

11. The antenna set of claim 5, wherein said device is selected from the group consisting of a Tablet PC, a laptop PC, a PDA, and a mobile phone.

12. An antenna set, comprising:
a base unit having a first base element and a second base element;
a first antenna unit having a first conducting element, a first radiating element, and a second radiating element, said first conducting element comprising a first supporting arm and a first signal arm, said first radiating element comprising a first emitting arm and a first connection arm, said second radiating element comprising a second emitting arm and a second connection arm, wherein said first connection arm of said first radiating element and said second connection arm of said second radiating element connect to said first signal arm of said first conducting element; and
a second antenna unit having a second conducting element, a third radiating element, and a fourth radiating element, said second conducting element comprising a second supporting arm and a second signal arm, said third radiating element comprising a third emitting arm and a third connection arm, said fourth radiating element comprising a fourth emitting arm and a fourth connection arm, wherein said third connection arm of said third radiating element and said fourth connection arm of said fourth radiating element connect to said second signal arm of said second conducting element;
wherein said first supporting arm of said first antenna unit connects to said first base element of said base unit, wherein said second supporting arm of said second antenna unit connects to said second base element of said base unit, and wherein said first base element is substantially perpendicular to said second base element.

13. The antenna set of claim 12, wherein said first signal arm is substantially parallel to said first base element, and said second signal arm is substantially parallel to said second base element.

14. The antenna set of claim 13, wherein said first antenna unit is substantially identical to said second antenna unit.

15. An antenna, comprising:
a base having a ground point located at an edge of said base;
a first L-shaped element comprising a first arm and a second arm, said second arm of said first L-shaped element having a first length;
a second L-shaped element for sending and/or receiving signals in a first frequency band, said second L-shaped element having a first arm and a second arm;
a third L-shaped element for sending and/or receiving signals in a second frequency band, said third L-shaped element having a first arm and a second arm; and
a signal feed;
wherein said first arm of said first L-shaped element connects substantially perpendicularly to said base at a first connection point, wherein said second arm of said first L-shaped element is substantially parallel to said edge of said base, and wherein said first arm of said second L-shaped element connects to said second arm of said first L-shaped element at a second connection point,
wherein said signal feed is located at said second arm of said first L-shaped element, and said signal feed and said second connection point are separated by a first predetermined distance,
wherein said first L-shaped element, said edge of said base, said ground point, and said signal feed form a slot structure for sending and/or receiving signals in said first frequency band, and
wherein said first arm of said third L-shaped element connects to said second arm of said first L-shaped element at a third connection point, and said third connection point and said second connection point are separated by a second predetermined distance.

16. The antenna of claim 15, wherein said first length is substantially one-half of a wavelength corresponding to said first frequency, wherein a length of said second arm of said second L-shaped element is substantially one-quarter of a wavelength corresponding to said first frequency, and wherein a length of said second arm of said third L-shaped element is substantially one-half of a wavelength corresponding to said second frequency.

* * * * *

UNITED STATES PATENT AND TRADEMARK OFFICE
CERTIFICATE OF CORRECTION

PATENT NO. : 7,161,543 B2 Page 1 of 1
APPLICATION NO. : 10/973379
DATED : January 9, 2007
INVENTOR(S) : Cheng et al.

It is certified that error appears in the above-identified patent and that said Letters Patent is hereby corrected as shown below:

On the bibliographic data sheet of the patent,

Item (73) Assignee: "Winston NeWeb Corp.,", should be changed to -- Wistron Neweb Corp., --.

Signed and Sealed this

Twenty-ninth Day of June, 2010

David J. Kappos
*Director of the United States Patent and Trademark Office*